(12) United States Patent
Liu

(10) Patent No.: US 7,990,972 B2
(45) Date of Patent: Aug. 2, 2011

(54) NETWORK COMMUNICATION DEVICE AND A PACKET ROUTING METHOD

(75) Inventor: Yi-Wen Liu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 427 days.

(21) Appl. No.: 12/189,798

(22) Filed: Aug. 12, 2008

(65) Prior Publication Data

US 2009/0180474 A1 Jul. 16, 2009

(30) Foreign Application Priority Data

Jan. 11, 2008 (CN) .......................... 2008 1 0300072

(51) Int. Cl.
*H04L 12/56* (2006.01)
(52) U.S. Cl. ....................................................... 370/392
(58) Field of Classification Search ........................ None
See application file for complete search history.

(56) References Cited

U.S. PATENT DOCUMENTS

| 6,457,061 | B1 * | 9/2002 | Bal et al. ........................ 709/245 |
| 2006/0023744 | A1 * | 2/2006 | Chen et al. ..................... 370/466 |
| 2007/0162968 | A1 * | 7/2007 | Ferreira et al. .................. 726/12 |
| 2008/0240102 | A1 * | 10/2008 | Rajsic et al. .................... 370/392 |

FOREIGN PATENT DOCUMENTS

CN 1444363 A 9/2003

* cited by examiner

*Primary Examiner* — Chirag G Shah
*Assistant Examiner* — Yong Zhou
(74) *Attorney, Agent, or Firm* — Frank R. Niranjan

(57) ABSTRACT

A network communication device includes a transceiver module, an address translation module, a control buffer module, an IP routing module, and a processor. The transceiver module is configured for forwarding packets. The address translation module determines if addresses of the forwarded packets need to be translated and translates the addresses of the forwarded packets when needed. Next, the address translation module marks the packets of translated addresses with flags and records the flags in the control buffer module. The IP routing module routes the forwarded packets from the address translation module and sends the forwarded packets back to the address translation module. The address translation module receives the forwarded packets from the IP routing module, determines if the addresses of the forwarded packets have been translated by querying the flags in the control buffer module, and sends the forwarded packets that have been translated to the transceiver module.

14 Claims, 4 Drawing Sheets

NETWORK COMMUNICATION DEVICE AND A PACKET ROUTING METHOD

BACKGROUND

1. Field of the Invention

Embodiments of the present disclosure relate to network communication devices, and more particularly to a network communication device and a method for routing packets with translated addresses.

2. Description of related art

A company may have an internal communication network allowing employees to communicate internally with each other Alternatively, the internal communication network can be connected to the Internet for accessing more information. When company computers are connected to the Internet, they are configured with internet protocol (IP) addresses. However, companies usually have a limited number of IP addresses. As a result, an IP sharing device is used to distribute the limited number of IP addresses among employees, allowing numerous employees access to the Internet simultaneously. The IP sharing devices can translate virtual IP addresses in compliance with the internal network into physical IP addresses on the Internet.

One such IP sharing device translates addresses of internal packets via an address translation module, sends the internal packets with the translated addresses to an IP routing module for routing, and sends the internal packets with the translated address to an address translation module to be forwarded to the Internet. The internal packets are sent to the address translation module twice before being sent to the external network, which is unnecessary time spent on forwarding packets, thereby decreasing the utilization efficiency of the IP address sharing devices.

SUMMARY

A network communication device for forwarding packets between a plurality of user terminal devices and a communication network includes a transceiver module, an address translation module, a control buffer module, an internet protocol (IP) routing module, and a processor. The transceiver module is configured for forwarding the packets between the plurality of user terminal devices and the communication network. The address translation module is configured for receiving the packets forwarded from the transceiver module, determining if addresses of the packets forwarded from the transceiver module need to be translated, translating the addresses of the packets forwarded from the transceiver module upon the condition that the addresses of the packets forwarded from the transceiver module need to be translated, and marking the packets of translated addresses with flags. The control buffer module is configured for recording the flags of the marked packets of translated addresses. The IP routing module is configured for routing the packets from the address translation module and sending the packets back to the address translation module. The processor executes the transceiver module, the address translation module, the control buffer module, and the IP routing module. The address translation module determines if the addresses of the packets sent back from the IP routing module have been translated by querying the flags in the control buffer module when receiving the packets sent back from the IP routing module, and directly sends the marked packets from the IP routing module to the transceiver module.

Other advantages and novel features will become more apparent from the following detailed description when taken in conjunction with the accompanying drawings.

DETAILED DESCRIPTION OF CERTAIN INVENTIVE EMBODIMENTS

As used herein, the term, "packet" is defined as a formatted piece of data used for communication between one or more devices across a communication network. It may be understood that the packet can be transmitted and/or received as a series of bytes, characters, or bits alone.

Figure 1:
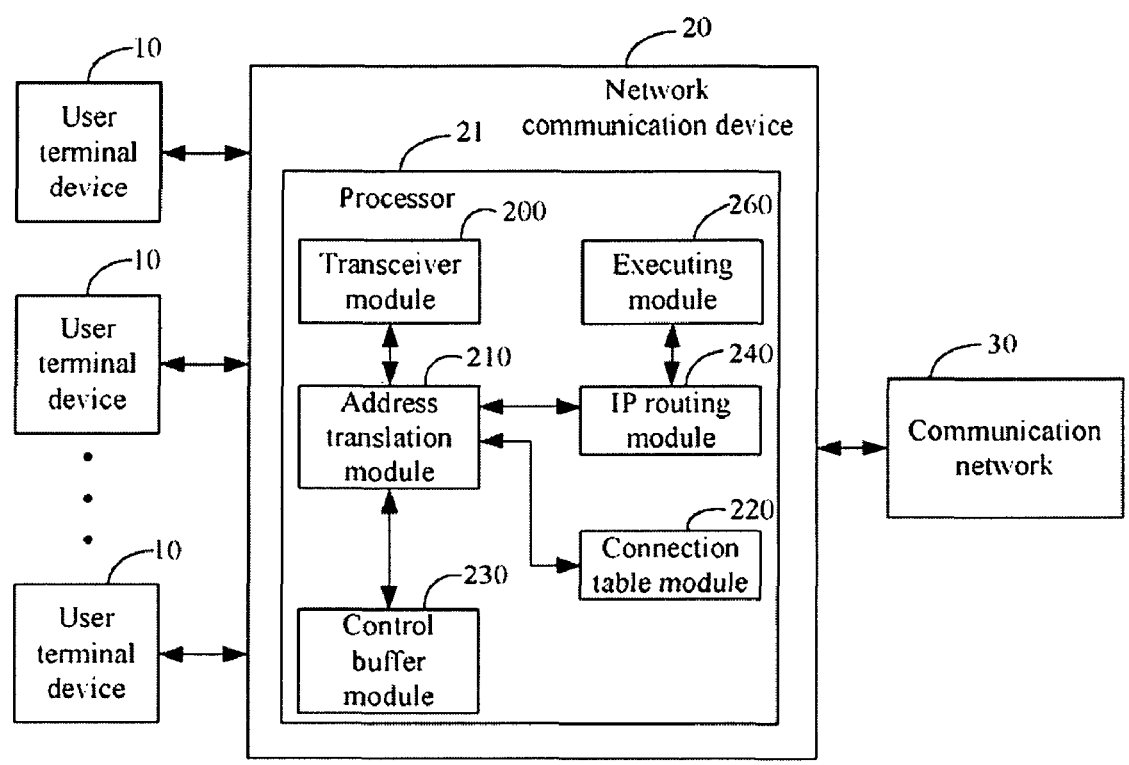
FIG. 1 is a schematic diagram of one embodiment of a network communication device of the present disclosure.

FIG. 1 is a schematic diagram of one embodiment of a network communication device 20 of the present disclosure. In one embodiment, the network communication device 20 is connected to a plurality of user terminal devices 10 and a communication network 30, and is configured for forwarding packets between one or more of the user terminal devices 10, the network communication device 20, and the communication network 30. In one embodiment, the packets include internal packets, self packets, and forwarding packets. The internal packets indicate packets forwarded between the user terminal devices 10. The self packets indicate packets forwarded between the user terminal devices 10 and the network communication device 20. The forwarding packets indicate packets forwarded between the user terminal devices 10 and the communication network 30. In one embodiment, the self packets include packets sent from the user terminal devices 10 to configure the network communication device 20 and response packets from the network communication device 20. In one embodiment, the network communication device 20 may be an internet protocol (IP) sharing device with network address translation functionality, while the user terminal device 10 may be a computer, a server, or a mobile device, such as a mobile phone or a personal digital assistant (PDA).

The network communication device 20 includes a transceiver module 200, an address translation module 210, a connection table module 220, a control buffer module 230, an IP routing module 240, and an executing module 260. The transceiver module 200 may include a plurality of physical ports. The network communication device further includes at least one specialized or general purpose processor, such as a processor 21 for executing the transceiver module 200, the address translation module 210, the connection table module 220, the control buffer module 230, the IP routing module 240, and the executing module 260.

The transceiver module 200 communicates with the user terminal devices 10 and the communication network 30 so as to receive packets sent from the user terminal devices 10 and the communication network 30. The transceiver module 200 may then send the received packets to the address translation module 210 (herein after referred as the forwarded packets).

The connection table module 220 is configured for recording data from the forwarded packets. In one embodiment, the data from the forwarded packets includes, but is not limited to, source addresses, destination addresses, source ports, destination ports, translated addresses, and translated ports of the forwarded packets. In one embodiment, the connection table module 220 records data from the forwarded packets in a table including several fields for source addresses, destination addresses, source ports, destination ports, translated addresses, and translated ports.

It may be understood that sources addresses and destination addresses of the forwarding packets are of different formats, and source addresses and destination addresses of the self packets and the internal packets are respectively of the same formats. Therefore, addresses of the self packets and internal packets do not need to be translated and the translated addresses and translated ports fields of the received self packets and internal packets are null, and addresses of the forwarding packets need to be translated to transform formats of the source addresses and the destination addresses.

The address translation module 210 is connected to the transceiver module 200, the connection table module 220, and the IP routing module 240, and is configured for receiving the forwarded packets from the transceiver module 200 and determining if addresses of the r forwarded packets should be translated. In one embodiment, the address translation module 210 queries the source ports, the destination ports, and the translated ports in the connection table module 220 to determine if the addresses of the forwarded packets should be translated. If there are matching source ports and destination ports in the connection table module 220 with those from the forwarded packets, and the matching source ports and destination ports do not have corresponding translated ports, the address translation module 210 determines the addresses of the forwarded packets that do not need to be translated. If there are matching source ports and destination ports in the connection table module 220 with those from the forwarded packets, and the matching source ports and destination ports have corresponding translated ports, the address translation module 210 determines that the addresses of the forwarded packets need to be translated. If there are no matching source ports and destination ports in the connection table module 220 with those from the forwarded packets, the address translation module 210 further determines if the addresses of the forwarded packets need to be translated according to source addresses and destination addresses thereof, and also stores corresponding data of the forwarded packets in the connection table module 220. If one of the source addresses and the destination addresses is the communication network 30, the addresses of the forwarded packets need to be translated, otherwise, the addresses of the forwarded packets do not need to be translated.

If the address translation module 210 determines the addresses of the forwarded packets do not need to be translated, the address translation module 210 sends the forwarded packets to the IP routing module 240.

The address translation module 210 is further configured for translating the addresses of the forwarded packets, marking the forwarded packets of translated addresses with flags, recording the flags in the control buffer module 230, and sending the forwarded packets including the marked packets and unmarked packets to the IP routing module 240 if the addresses of the forwarded packets need to be translated. In one embodiment, the address translation module 210 marks the forwarded packets of translated addresses with a numeral "1."

The control buffer module 230 is configured for recording flags. In one embodiment, a flag is configured for indicating a packet of translated addresses, and may be represented by the numeral "1". In alternative embodiments, the flag may be represented by other numerals or letters. In one embodiment, the control buffer module 230 sets the data structures to correspond to the forwarded packets, copies all the data from the forwarded packets to the data structures, and adds a field to the data structures to record the flags. In one particular embodiment, the control buffer module 230 may be a control buffer (cb[48]) of a socket buffer (sk_buff) of the Linux operating system. In alternative embodiments, the control buffer module 230 may be a control buffer of a socket buffer of other operating systems, such as Windows XP.

The IP routing module 240 is connected to the address translation module 210 and the executing module 260, and is configured for determining types of the forwarded packets from the address translation module 210, including the marked packets and the unmarked packets, and routing the determined types packets. The IP routing module 240 queries a routing table therein to determine types of the forwarded packets from the address translation module 210. In one embodiment, the forwarded packets from the address translation module 210 include the self packets, the internal packets, and the forwarding packets.

If the IP routing module 240 determines the forwarded packets are self packets, the IP routing module 240 sends the self packets to the executing module 260. If the IP routing module 240 determines the packets are not self packets, the IP routing module 240 sends the forwarded packets to the address translation module 210.

The executing module 260 is connected to the IP routing module 240 and is configured for receiving and processing the self packets from the IP routing module 240. The executing module 260 also sends other self packets, which are responses to the self packets to the IP routing module 240 to send to the address translation module 210.

The address translation module 210 is further configured for determining if the addresses of the forwarded packets from the IP routing module 240 need to be translated when receiving the forwarded packets from the IP routing module 240. If the address translation module 210 determines that the addresses of the forwarded packets from the IP routing module 240 do not need to be translated (i.e., the forwarded packets from the IP routing module 240 are self packets or internal packets), the address translation module 210 sends the forwarded packets from the IP routing module 240 to the transceiver module 200 to forward the forwarded packets from the IP routing module 240 to a corresponding one of the user terminal devices 10 and the communication network 30.

If the address translation module 210 determines the addresses of the forwarded packets from the IP routing module 240 need to be translated (i.e., the forwarded packets from the IP routing module 240 are forwarding packets), the address translation module 210 continues to determine if the addresses of the forwarded packets from the IP routing module 240 have been translated. In one embodiment, the address translation module 210 queries the flags in the control buffer module 230 to determine if the addresses of the forwarded packets from the IP routing module 240 have been translated.

In one embodiment, the address translation module 210 is further configured for releasing the flags from the control buffer module 230 and directly sending the forwarded packets from the IP routing module 240 to the transceiver module 200 to forward to the communication network 30 or the user terminal devices 10, assuming the address translation module 210 determines the addresses of the forwarded packets from the IP routing module 240 have been translated.

If the addresses of the forwarded packets from the IP routing module 240 have not been translated, the address translation module 210 translates addresses of the forwarded packets from the IP routing module 240 and sends the forwarded packets from the IP routing module 240 of translated addresses to the transceiver module 200 to forward to the communication network 30 or the user terminal devices 10. In one embodiment, the address translation module 210 does not need to mark the forwarded packets from the IP routing module 240 of translated addresses at this time. In one embodiment, the address translation module 210 includes a first address translation sub-module and a second address translation sub-module for translating a source address and a destination address of a forwarded packet, respectively. The address translation module 210 queries the connection table module 220 for data matching with that of the forwarded packet to determine a type of the forwarded packet. This, in turn, determines if the source address and the destination address of the forwarded packet should be translated by the first address translation sub-module and the second address translation sub-module or only one of the source address and the destination address should be translated. Next, the address translation module 210 processes the forwarded packet initially by the first address translation sub-module, then, by the second address translation sub-module. Finally, the network communication device 20 forwards the forwarded packet.

Figure 2:
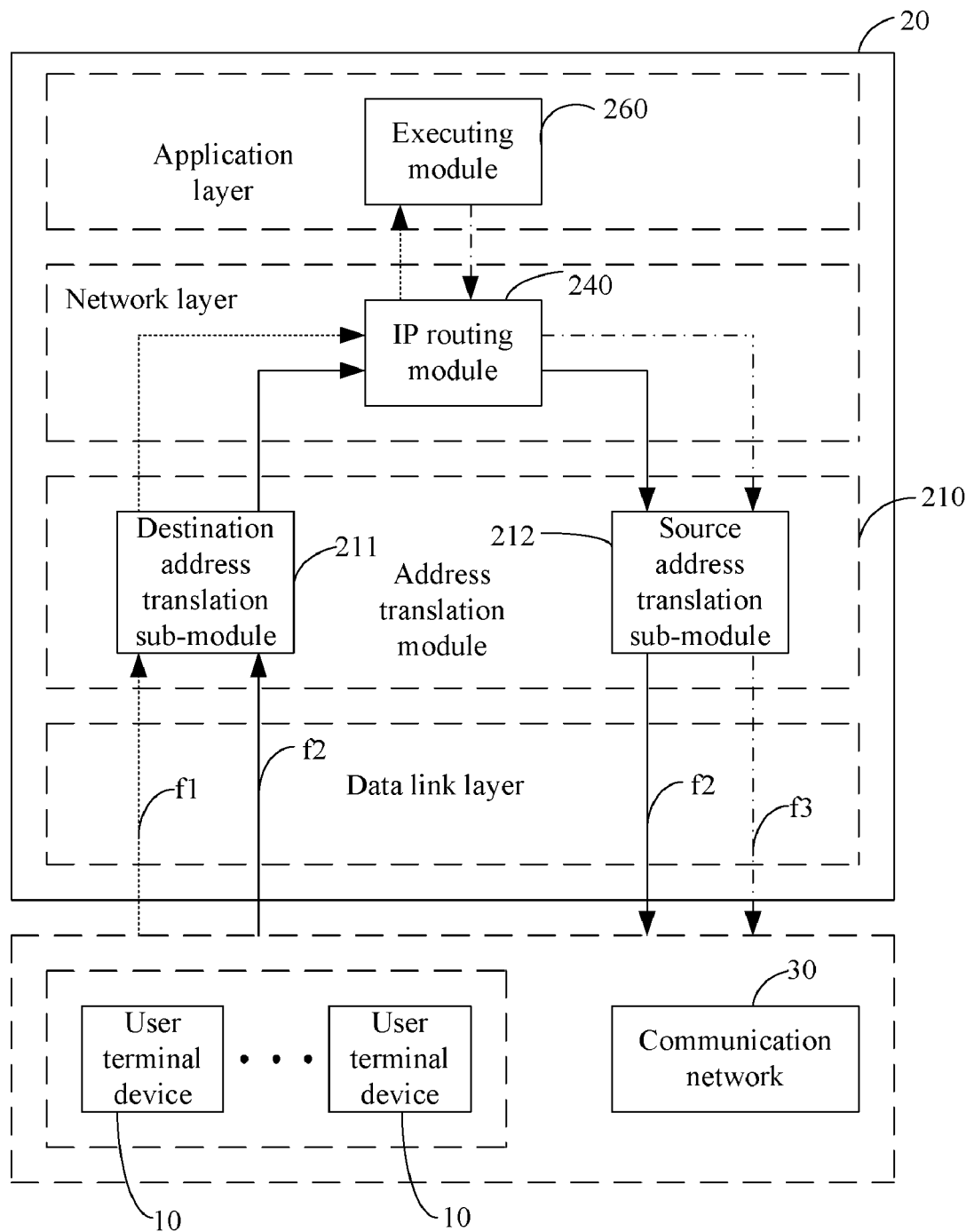
FIG. 2 is a schematic diagram of one embodiment of the network communication device processing packets.

For example, as shown in FIG. 2, the address translation module 210 includes a destination address translation sub-module 211 and a source address translation sub-module 212 for translating a source address and a destination address of a forwarded packet, respectively. In one embodiment, the destination address translation sub-module 211 receives a forwarded packet from the transceiver module 200 and determines if a destination address of the forwarded packet should be translated. If the destination address translation sub-module 211 determines the destination address of the forwarded packet should be translated, the destination address translation sub-module 211 translates the destination address of the forwarded packet, marks the forwarded packet with a flag, records the flag in the control buffer module 230, and sends the marked packet to the IP routing module 240. When the source address translation sub-module 212 receives the same packet, i.e. the marked packet, from the IP routing module 240, the source address translation sub-module 212 searches the flag in the control buffer module 230, determines the destination address of the marked packet has been translated, and directly sends the forwarded packets to the transceiver module 200.

If the destination address translation sub-module 211 determines the destination address of the forwarded packet should not be translated, the destination address translation sub-module 211 sends the forwarded packets to the IP routing module 240. When the source address translation sub-module 212 receives the same packet, i.e. the forwarded packet, from the IP routing module 240, the source address translation sub-module 212 determines a source address of the forwarded packet should be translated, translates the source address of the forwarded packet, and sends the forwarded packet of translated source address to the transceiver module 200. In one embodiment, source addresses of packets from the user terminal devices 10 to the communication network 30 and destination addresses of packets from the communication network 30 to the user terminal devices 10 should be translated.

In the embodiment of FIG. 2, paths f1, f2, and f3 are three paths in which the network communication device 20 processes packets. If the network communication device 20 receives a forwarding packet, the network communication device 20 processes the forwarding packet according to the path f2. If the network communication device 20 receives a self packet from the user terminal devices 10, the network communication device 20 processes the self packet according to the path f1. In other words, the self packet goes through the destination address translation sub-module 211, the IP routing module 240, and the executing module 260. After the executing module 260 processes the self packet, the executing module 260 generates a response packet, and the network communication device 20 processes the response packet according to the path f3. Specifically, the response packet goes through the executing module 260, the IP routing module 240, and the source address translation sub-module 212. The executing module 260 is in the application layer and the IP routing module 240 is in the network layer.

Figure 3:
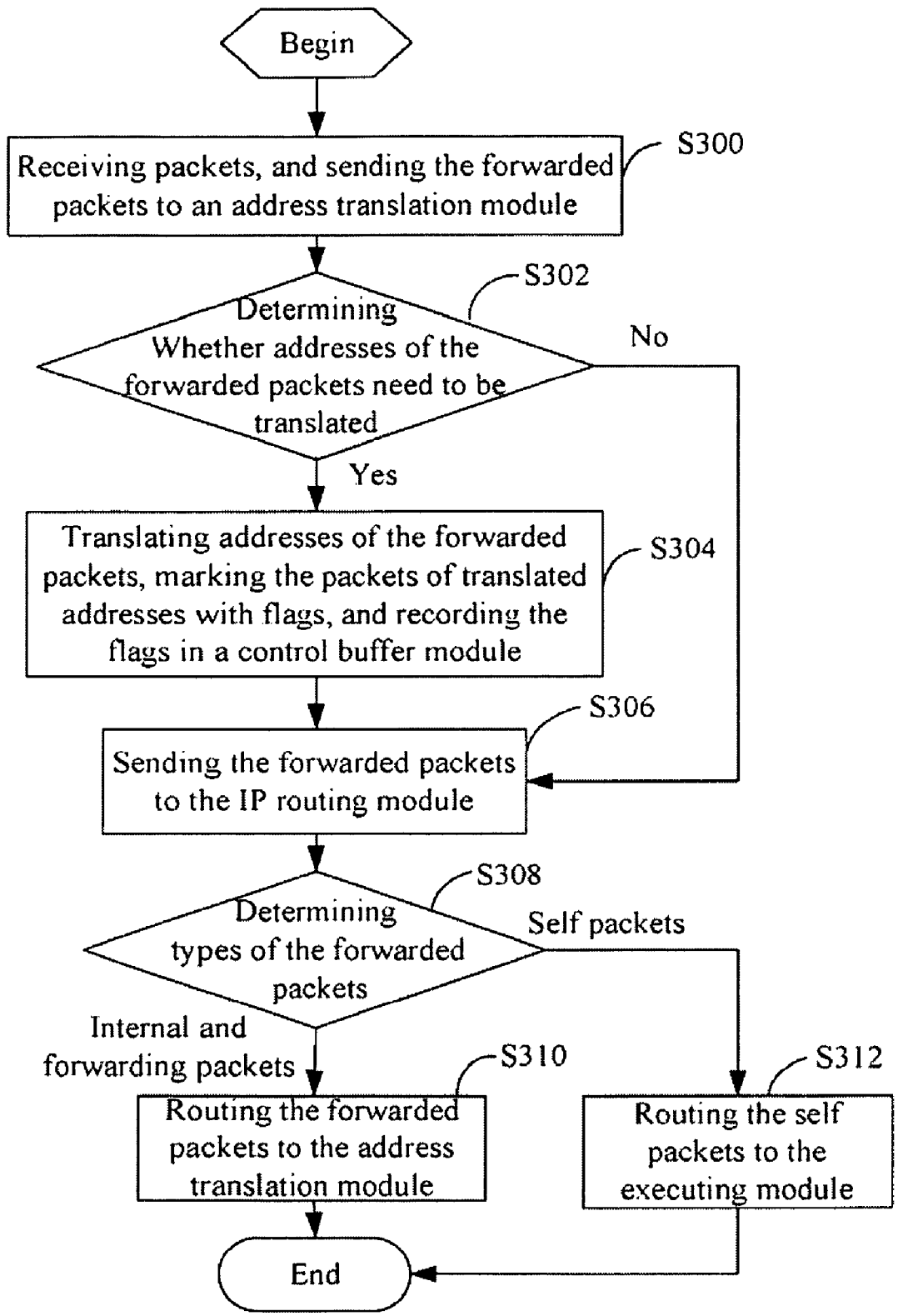
FIG. 3 is a flowchart of one embodiment of a packet routing method employed by the network communication device of the present disclosure.

FIG. 3 is a flowchart of one embodiment of a packet routing method employed by the network communication device of the present disclosure. In one embodiment, the user terminal devices 10 communicate with the communication network 30 via the network communication device 20, and the network communication device 20 forwards packets between one or more of the user terminal devices 10, the network communication device 20, and the communication network 30. The packets include self packets, internal packets, and forwarding packets.

In block S300, the transceiver module 200 receives packets and sends the packets to the address translation module 210 (hereinafter forwarded packets). In block S302, the address translation module 200 receives the forwarded packets from the transceiver module 200 and determines if addresses of the forwarded packets need to be translated. In one embodiment, the address translation module 210 queries the source ports, the destination ports, and the translated ports in the connection table module 220 to determine if the addresses of the forwarded packets should be translated. If there are matching source ports and destination ports in the connection table module 220 with those from the forwarded packets, and the matching source ports and destination ports do not have corresponding translated ports, the address translation module 210 determines the addresses of the forwarded packets do not need to be translated. If there are matching source ports and destination ports in the connection table module 220 with those from the forwarded packets, and the matching source ports and destination ports have corresponding translated ports, the address translation module 210 determines the addresses of the forwarded packets need to be translated. If there are no matching source ports and destination ports in the connection table module 220 with those from the forwarded packets, the address translation module 210 further determines if the addresses of the forwarded packets need to be translated according to source addresses and destination addresses thereof, and also stores corresponding data from the forwarded packets in the connection table module 220. If one of the source addresses and the destination addresses is the communication network 30, the addresses of the forwarded packets need to be translated, otherwise, the addresses of the forwarded packets do not need to be translated.

If the address translation module 210 determines the addresses of the forwarded packets need to be translated, in block S304, the address translation module 210 translates the addresses of the forwarded packets, marks the forwarded packets of translated addresses with flags, and records the flags in the control buffer module 230. Then, in block S306, the address translation module 210 sends the forwarded packets, including the marked packets and unmarked packets, to the IP routing module 240. If the address translation module 210 determines the addresses of the forwarded packets do not need to be translated, the process directly goes to block S306, wherein the address translation module 210 sends the forwarded packets to the IP routing module 240.

In block S308, the IP routing module 240 determines types of the forwarded packets from the address translation module 210. The IP routing module 240 queries a routing table therein to determine types of the forwarded packets from the address translation module 210. In one embodiment, the forwarded packets from the address translation module 210 include self packets, internal packets, and forwarding packets.

If the IP routing module 240 determines the forwarded packets are self packets, in block S312, the IP routing module 240 routs the self packets to the executing module 260, and the executing module 260 processes the self packets from the IP routing module 240.

If the IP routing module 240 determines the forwarded packets are internal packets or forwarding packets, in block S310, the IP routing module 240 routes the forwarded packets to the address translation module 210.

Figure 4:
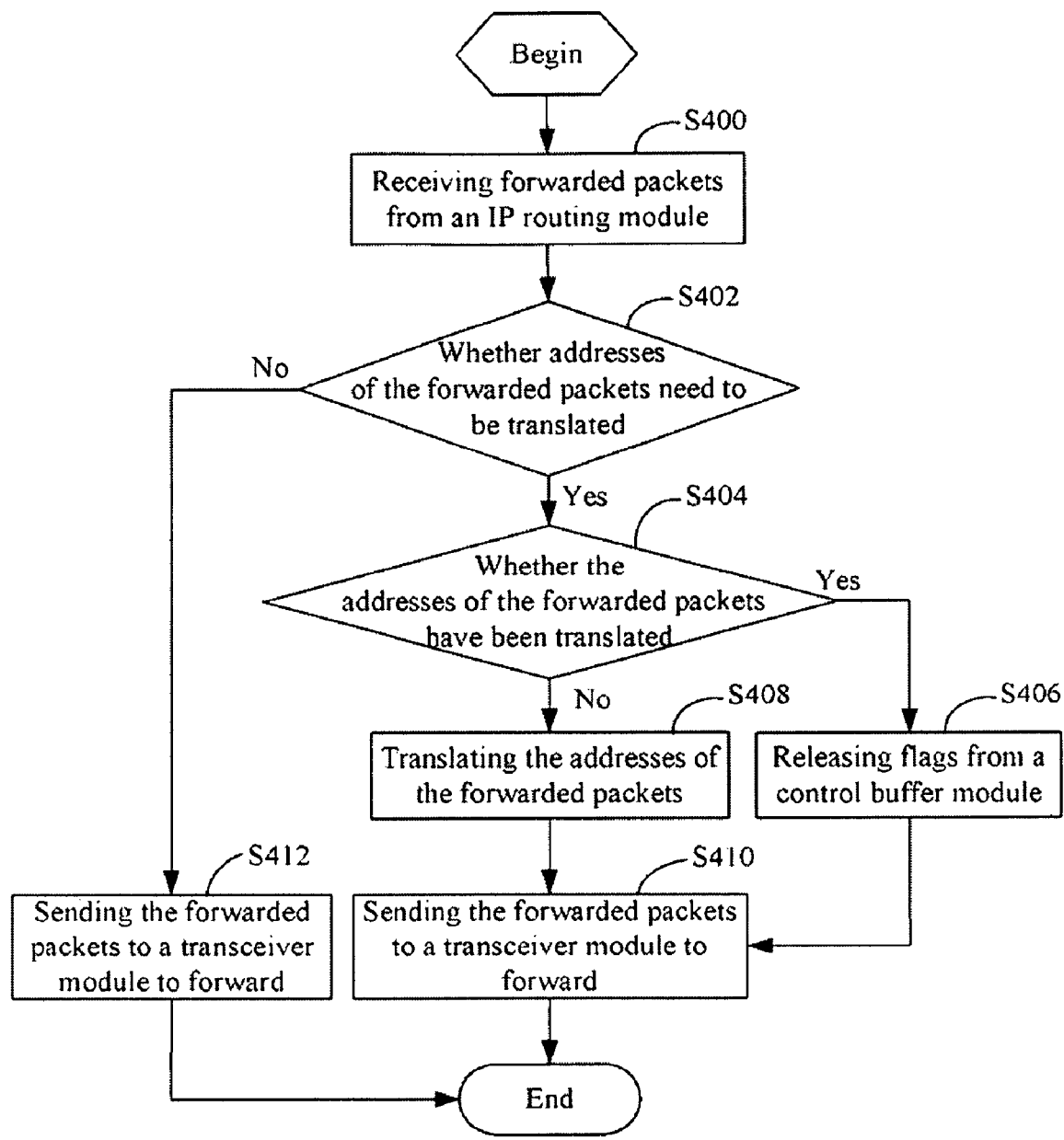
FIG. 4 is a flowchart of another embodiment of a packet routing method of employed by the network communication device of the present disclosure.

FIG. 4 is a flowchart of the packet routing method of the network communication device 20 after block S310 of FIG. 3. In block S400, the address translation module 210 receives the forwarded packets from the IP routing module 240. In block S402, the address translation module 210 determines if the addresses of the forwarded packets from the IP routing module 240 need to be translated. In one embodiment, the address translation module 210 searches the source ports, the destination ports, and the translated ports in the connection table module 220 to determine if the addresses of the forwarded packets from the IP routing module 240 should be translated.

If the address translation module 210 determines the addresses of the forwarded packets from the IP routing module 240 do not need to be translated, in block S412, the address translation module 210 sends the forwarded packets from the IP routing module 240 to the transceiver module 200 to forward the forwarded packets to corresponding user terminal devices 10.

If the address translation module 210 determines the addresses of the forwarded packets from the IP routing module 240 need to be translated, in block S404, the address translation module 210 determines if the addresses of the forwarded packets from the IP routing module 240 have been translated. In one embodiment, the address translation module 210 queries the flags in the control buffer module 230 to determine if the addresses of the forwarded packets from the IP routing module 240 have been translated.

If the addresses of the forwarded packets from the IP routing module 240 have been translated, in block S406, the address translation module 210 releases the flags from the control buffer module 230. Then, in block S410, the address translation module 210 sends the forwarded packets from the IP routing module 240 to the transceiver module 200 to forward the forwarded packets.

If the addresses of the forwarded packets from the IP routing module 240 have not been translated, in block S408, the address translation module 210 translates the addresses of the forwarded packets from the IP routing module 240. In one embodiment, at this time, the address translation module 210 does not need to mark the forwarded packets from the IP routing module 240 with translated addresses. Then, in block S410, the address translation module 210 sends the forwarded packets to the transceiver module 200 to forward the forwarded packets.

The network communication device 20 marks packets that have had their addresses translated by the address translation module 210, thereby preventing the address translation module 210 from translating each packet more than once when the packets repeatedly enter the address translation module 210. This saves time spent on address translation and increases the forwarding efficiency of the network communication device 20.

The foregoing disclosure of various embodiments have been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the present disclosure is to be defined only by the claims appended hereto and their equivalents.

What is claimed is:

1. A network communication device for forwarding packets between a plurality of user terminal devices and a communication network, the network communication device comprising:
    a transceiver module configured for forwarding the packets between the plurality of user terminal devices and the communication network;
    an address translation module configured for receiving the packets forwarded from the transceiver module, determining if destination addresses of the packets forwarded from the transceiver module need to be translated, translating the destination addresses of the packets forwarded from the transceiver module upon the condition that the destination addresses of the packets forwarded from the transceiver module need to be translated, and marking the packets of translated addresses with flags;
    a control buffer module configured for recording the flags of the marked packets of translated addresses;
    an internet protocol (IP) routing module configured for receiving the packets from the address translation module and sending the packets from the address translation module back to the address translation module; and
    a processor that executes the transceiver module, the address translation module, the control buffer module, and the IP routing module;
    wherein the address translation module determines if the destination addresses of the packets sent back from the IP routing module have been translated by querying the flags in the control buffer module when receiving the packets sent back from the IP routing module, and directly sends the marked packets from the IP routing module to the transceiver module, wherein the address translation module is further configured for releasing the flags from the control buffer module if the address translation module determines the destination addresses of the packets sent back from the IP routing module have been translated.

2. The network communication device of claim 1, further comprising a connection table module configured for recording data from the packets forwarded from the transceiver module, wherein the data from the packets forwarded from the transceiver module include source addresses, destination addresses, source ports, destination ports, translated addresses, and translated ports of the packets forwarded from the transceiver module.

3. The network communication device of claim 2, wherein the address translation module queries the source ports, the destination ports, and the translated ports in the connection table module to determine if the destination addresses of the packets forwarded from the transceiver module need to be translated.

4. The network communication device of claim 3, wherein the address translation module determines the destination addresses of the packets forwarded from the transceiver module do not need to be translated upon the condition that there are matching source ports and destination ports in the connection table module with those from the packets forwarded from the transceiver module, and the matching source ports and destination ports do not have corresponding translated ports.

5. The network communication device of claim 3, wherein the address translation module determines the destination addresses of the packets forwarded from the transceiver module need to be translated upon the condition that there are matching source ports and destination ports in the connection table module with those from the packets forwarded from the transceiver module, and the matching source ports and destination ports have corresponding translated ports.

6. The network communication device of claim 3, wherein the address translation module further determines if the destination addresses of the packets forwarded from the transceiver module need to be translated according to source addresses and destination addresses of the packets forwarded from the transceiver module and stores corresponding data from the packets forwarded from the transceiver module in the connection table module if there are no matching source ports and destination ports in the connection table module with those from the packets forwarded from the transceiver module.

7. The network communication device of claim 6, wherein if the source addresses is the network, the address translation module determines the destination addresses of the packets forwarded from the transceiver module need to be translated.

8. The network communication device of claim 1, wherein the address translation module is configured for directly sending the packets forwarded from the transceiver module to the IP routing module if the address translation module determines the destination addresses of the packets forwarded from the transceiver module do not need to be translated.

9. A packet routing method for utilization in a network communication device for forwarding packets between a plurality of user terminal devices and a communication network, comprising:
receiving the packets forwarded from a transceiver module by an address translation module;
determining if destination addresses of the packets forwarded from the transceiver module need to be translated;
translating the destination addresses of the packets forwarded from the transceiver module, marking the packets of translated addresses with flags, and recording the flags in a control buffer module, if the destination addresses of the packets forwarded from the transceiver module need to be translated;
sending the packets comprising marked packets and unmarked packets to an internet protocol (IP) routing module;
sending the packets comprising the marked packets and unmarked packets back to the address translation module by the IP routing module;
determining if the destination addresses of the packets sent back from the IP routing module have been translated by querying the flags in the control buffer module;
sending the packets sent back from the IP routing module to the transceiver module to forward the packets sent back from the IP routing module upon the condition that the destination addresses of the packets sent back from the IP routing module have been translated; and
releasing the flags from the control buffer module.

10. The packet routing method of claim 9, wherein the block of determining if destination addresses of the packets forwarded from the transceiver module need to be translated comprises:
querying source ports, destination ports, and translated ports in a connection table module to determine if the destination addresses of the packets forwarded from the transceiver module need to be translated.

11. The packet routing method of claim 10, wherein the block of determining if destination addresses of the packets forwarded from the transceiver module need to be translated comprises:
determining the destination addresses of the packets forwarded from the transceiver module do not need to be translated if there are matching source ports and destination ports in the connection table module with those from the packets forwarded from the transceiver module, and the matching source ports and destination ports do not have corresponding translated ports; and
determining the destination addresses of the packets forwarded from the transceiver module need to be translated if there are matching source ports and destination ports in the connection table module with those from the packets forwarded from the transceiver module, and the matching source ports and destination ports have corresponding translated ports.

12. The packet routing method of claim 10, wherein the block of determining if destination addresses of the packets forwarded from the transceiver module need to be translated further comprises:
determining if the destination addresses of the packets forwarded from the transceiver module need to be translated according to source addresses and destination addresses thereof if there are no matching source ports and destination ports in the connection table module with those from the packets forwarded from the transceiver module; and
storing corresponding data from the packets forwarded from the transceiver module in the connection table module.

13. The packet routing method of claim 9, further comprising a block of determining if source addresses of the packets sent back from the IP routing module need to be translated before the block of determining if the destination addresses of the packets sent back from the IP routing module have been translated.

14. The packet routing method of claim 9, further comprising:
translating the source addresses of the packets sent back from the IP routing module if the destination addresses of the packets sent back from the IP routing module have not been translated.

* * * * *